United States Patent
Takahashi et al.

(10) Patent No.: US 12,191,737 B2
(45) Date of Patent: Jan. 7, 2025

(54) ROTARY RECIPROCATING DRIVING ACTUATOR

(71) Applicants: Yuki Takahashi, Tokyo (JP); Yasutaka Kitamura, Tokyo (JP); Masaharu Kagami, Tokyo (JP)

(72) Inventors: Yuki Takahashi, Tokyo (JP); Yasutaka Kitamura, Tokyo (JP); Masaharu Kagami, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 252 days.

(21) Appl. No.: 17/854,018

(22) Filed: Jun. 30, 2022

(65) Prior Publication Data
US 2023/0006526 A1   Jan. 5, 2023

(30) Foreign Application Priority Data
Jun. 30, 2021   (JP) .................... 2021-109245

(51) Int. Cl.
*H02K 33/12*   (2006.01)
*G02B 26/08*   (2006.01)
*G02B 26/12*   (2006.01)

(52) U.S. Cl.
CPC ......... *H02K 33/12* (2013.01); *G02B 26/0816* (2013.01); *G02B 26/121* (2013.01)

(58) Field of Classification Search
CPC .................................................. H02K 33/12
See application file for complete search history.

(56) References Cited

U.S. PATENT DOCUMENTS

| | | | |
|---|---|---|---|
| 11,664,713 B2 * | 5/2023 | Takahashi | H02K 33/12 310/15 |
| 11,909,291 B2 * | 2/2024 | Takahashi | H02K 1/141 |
| 11,936,250 B2 * | 3/2024 | Kitamura | H02K 1/143 |
| 2021/0184554 A1 | 6/2021 | Takahashi et al. | |
| 2021/0265904 A1 * | 8/2021 | Takahashi | H02K 11/22 |
| 2022/0043255 A1 * | 2/2022 | Kitamura | H02K 1/143 |
| 2023/0006526 A1 * | 1/2023 | Takahashi | H02K 11/22 |
| 2023/0361646 A1 * | 11/2023 | Moser | H02K 5/18 |

FOREIGN PATENT DOCUMENTS

| | | |
|---|---|---|
| EP | 3817204 | 5/2021 |
| JP | 4727509 | 7/2011 |

OTHER PUBLICATIONS

European Search Report and the European Search Opinion Dated Nov. 17, 2022 From the European Patent Office Re. Application No. 22182096.2. (9Pages).

* cited by examiner

*Primary Examiner* — Robert W Horn (57) ABSTRACT

A rotary reciprocating driving actuator includes: a movable member including a shaft part and a magnet; and a fixing body including a core assembly including a magnetic pole core with an integral structure including a plurality of magnetic poles, a plurality of coils disposed next to the plurality of magnetic poles, and a magnetic path core to which the magnetic pole core is assembled, wherein the core assembly is disposed such that the plurality of magnetic poles faces an outer periphery of the magnet, wherein a magnetic flux that passes through a magnetic path configured of the magnetic path core and the magnetic pole core of the integral structure is generated through energization of the plurality of coils, and the movable member is rotated back and forth around an axis of the shaft part through electromagnetic interaction of the magnetic flux and the magnet.

11 Claims, 10 Drawing Sheets

ROTARY RECIPROCATING DRIVING ACTUATOR

CROSS REFERENCE TO RELATED APPLICATIONS

This application is entitled to (or claims) the benefit of priority of Japanese Patent Application No. 2021-109245, filed on Jun. 30, 2021, the disclosure of which including the specification, drawings and abstract is incorporated herein by reference in its entirety.

TECHNICAL FIELD

The present invention relates to a rotary reciprocating driving actuator.

BACKGROUND ART

In the related art, a rotary reciprocating driving actuator is used as an actuator used for a scanner such as a multifunctional device and a laser beam printer. To be more specific, rotary reciprocating driving actuators perform optical scanning of an object by changing the reflection angle of laser light by rotating the mirror of the scanner back and forth.

PTL 1 discloses a rotary reciprocating driving actuator of this type using a galvano motor. Various types of galvano motors are known, including the type with the structure disclosed in PTL 1 and the coil movable type in which the coil is attached to the mirror.

PTL 1 discloses a beam scanner in which four permanent magnets are provided on a rotating shaft to which a mirror is attached, so as to be magnetized in the radial direction of the rotating shaft, and a core with magnetic poles around which coils are wound is positioned across the rotating shaft.

CITATION LIST

Patent Literature

PTL 1
Japanese Patent Publication No. 4727509

SUMMARY OF INVENTION

Technical Problem

In coil-movable rotary reciprocating driving actuators, heat generated by the coil during drive may adversely affect the surface condition of the mirror, the mirror's connection to the axis of rotation, and the mirror's shape, including warpage. In addition, in coil-movable rotary reciprocating driving actuators, it is difficult to increase the input current to the coil in consideration of the heat generated by the coil when energized, making it difficult to increase the size and amplitude of the mirror, which is the movable object. In addition, the wiring to the coil needs to be drawn out to the fixed body of the mirror, which is a movable object, making assembly difficult.

In PTL 1, the magnet is positioned on the movable body side. Although this eliminates the problem with the coil movable type described above, in order to keep the magnet stationary in a neutral position with respect to the core, i.e., to position the switching portion of the magnet's poles in the center of the core, two magnets per pole of the core, for a total of four poles, are required.

Therefore, compared to a similar rotary reciprocating driving actuator using, for example, two magnets, the amplitude of the movable body becomes smaller, i.e., the swing range is reduced. In addition, since at least four magnets are used, the number of parts is large and the configuration is complex, making assembly difficult.

In recent years, there has been a growing demand for rotary reciprocating driving actuators for scanners that are rigid, shock- and vibration-resistant, easy to assemble, and can achieve higher amplitudes, in anticipation of larger mirrors, which are moving parts.

In PTL 1, in the core, a protruding pole-type yoke, a plurality of slots, which are magnetic poles, are arranged parallel with each other and protrude from each of the tips of the coil-wound portion, bent in a direction facing each other, so as to sandwich a magnet on the rotating shaft. In the case of a core with a complex shape such as a protruding pole-type yoke, machining is time-consuming and the cost of the device itself is high.

An object of the present invention is to provide a rotary reciprocating driving actuator that can drive the movable object at a high amplitude and is easy to assemble while ensuring the rigidity of the core and reducing production cost.

Solution to Problem

To achieve the above-mentioned object, a rotary reciprocating driving actuator of an embodiment of the present invention includes: a movable member including a shaft part to which a movable object is connected and a magnet fixed to the shaft part; and a fixing body including a core assembly including a magnetic pole core with an integral structure including a plurality of magnetic poles, a plurality of coils disposed next to the plurality of magnetic poles, and a magnetic path core to which the magnetic pole core is assembled, wherein the core assembly is disposed such that the plurality of magnetic poles faces an outer periphery of the magnet, wherein a magnetic flux that passes through a magnetic path configured of the magnetic path core and the magnetic pole core of the integral structure is generated through energization of the plurality of coils, and the movable member is rotated back and forth around an axis of the shaft part through electromagnetic interaction of the magnetic flux and the magnet.

Advantageous Effects of Invention

According to the present invention, it is possible to drive the movable object at a high amplitude and is easy to assemble while ensuring the rigidity of the core and reducing production cost.

DESCRIPTION OF EMBODIMENTS

An embodiment of the present invention is described below with reference to the accompanying drawings.

Figure 1:
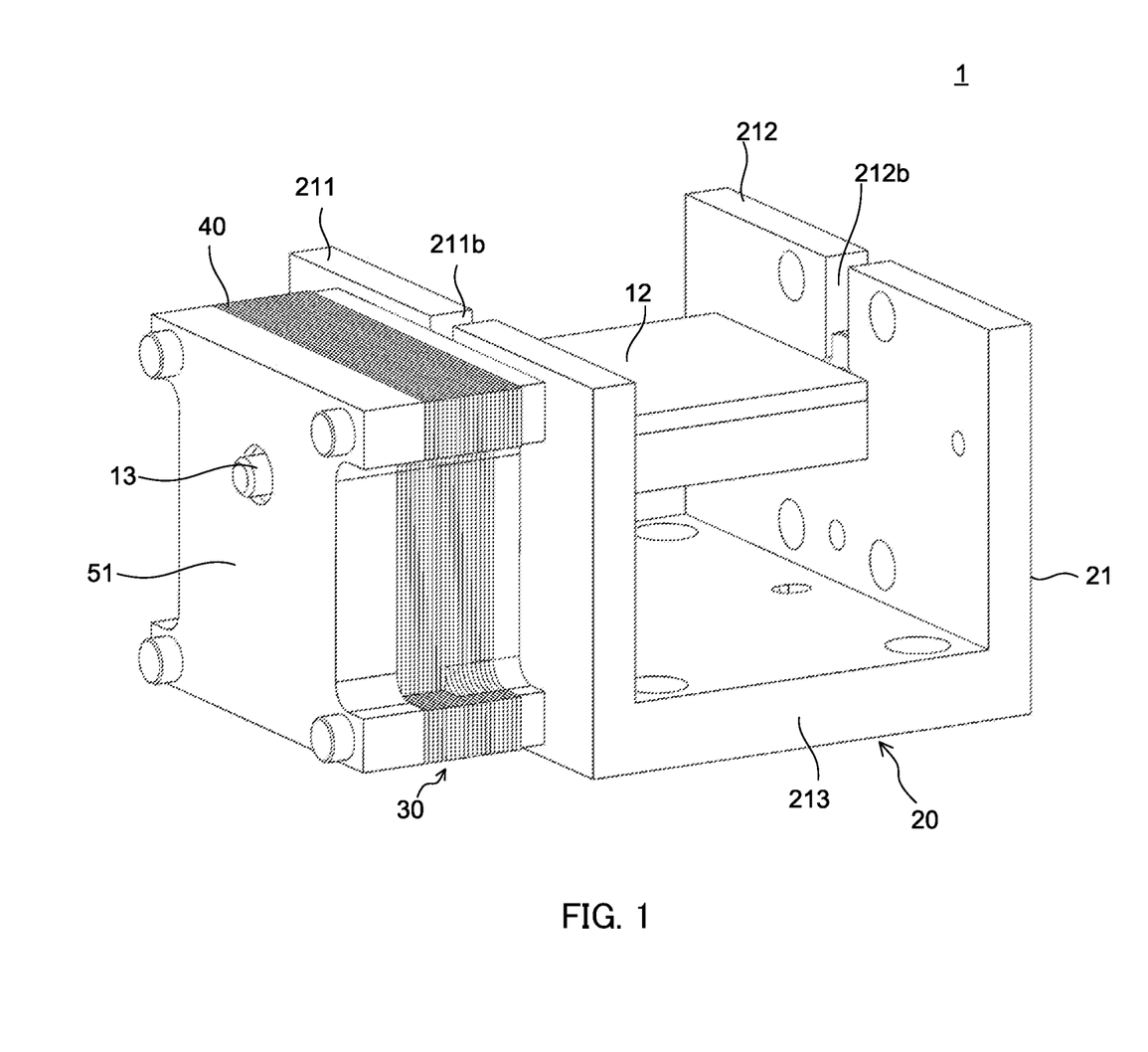
FIG. 1 is a perspective view illustrating an external appearance of a rotary reciprocating driving actuator of an embodiment.
Figure 2:
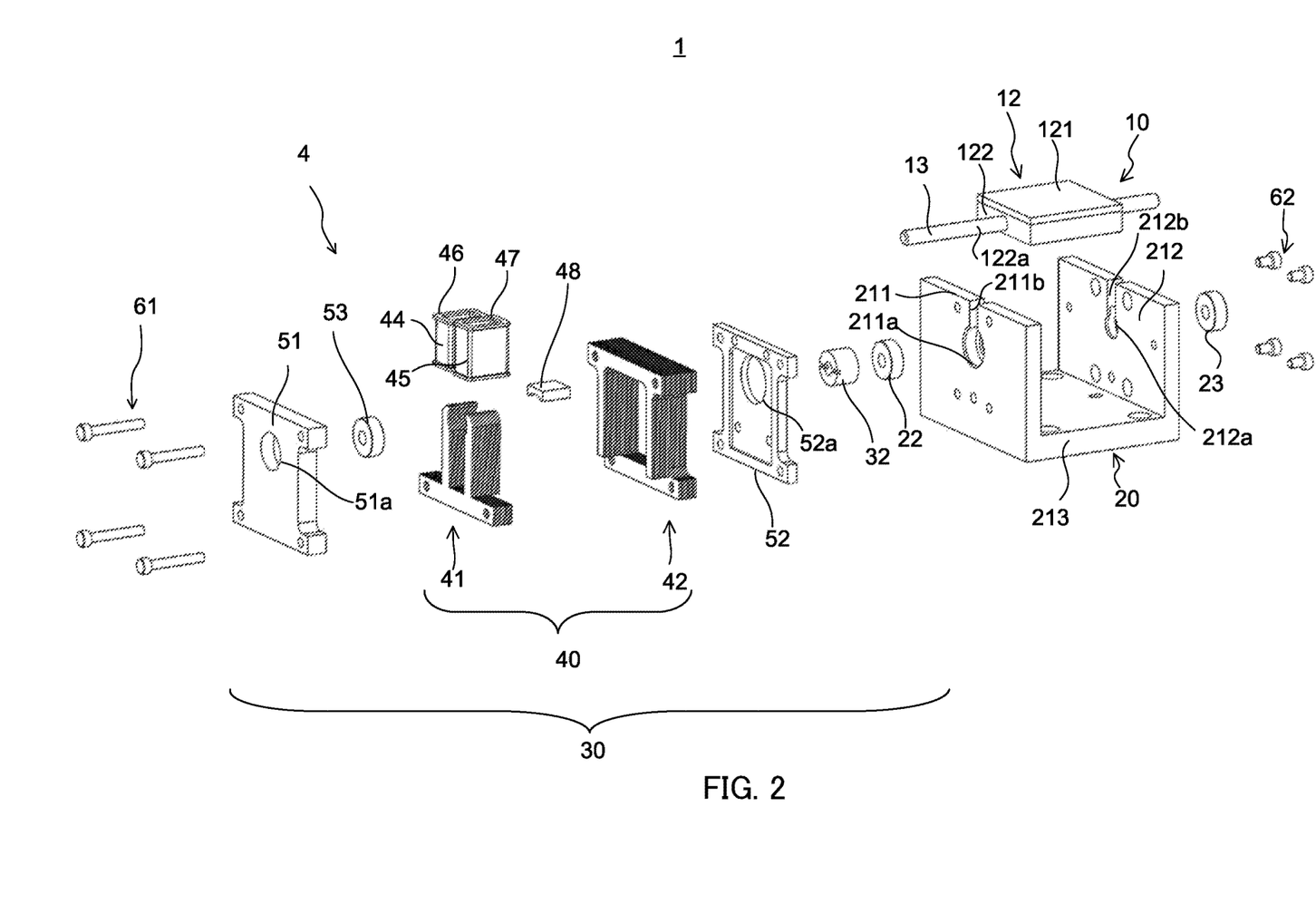
FIG. 2 is an exploded perspective view of the rotary reciprocating driving actuator.
Figure 3:
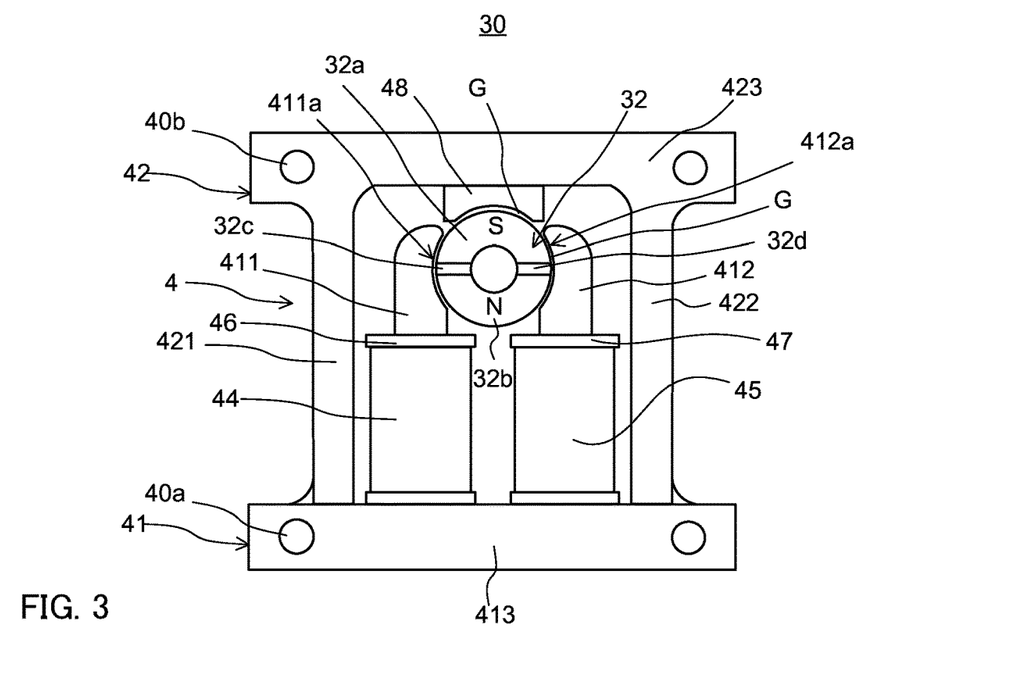
FIG. 3 is a left side view illustrating a configuration of a main part of a driving part of the rotary reciprocating driving actuator.

FIG. 1 is a perspective view illustrating an external appearance of a rotary reciprocating driving actuator of an embodiment. FIG. 2 is an exploded perspective view of the rotary reciprocating driving actuator. FIG. 3 is a left side view of a configuration of a main part of a driving part of the rotary reciprocating driving actuator in which a first case is detached in the driving part.

Rotary reciprocating driving actuator 1 is used for laser imaging detection and ranging (LiDAR) devices, for example. Note that rotary reciprocating driving actuator 1 is also applicable to optical scanning devices such as multifunctional devices and laser beam printers.

Rotary reciprocating driving actuator 1 mainly includes movable member 10, base part 21 that rotatably supports movable member 10, and driving part 30 that rotates movable member 10 back and forth with respect to base part 21. Base part 21 and driving part 30 make up fixing body 20 that supports movable member 10 in such a manner that movable member 10 can be driven into reciprocation rotation.

Movable member 10 includes rotation shaft 13, mirror part 12 and movable magnet (hereinafter referred to simply as "magnet") 32. Note that details of magnet 32 will be elaborated together with driving part 30 described later.

Mirror part 12 is a movable object in rotary reciprocating driving actuator 1, and is connected to rotation shaft 13. Mirror part 12 is formed by bonding mirror 121 to one surface of mirror holder 122, for example. Rotation shaft 13 is inserted to insertion hole 122a of mirror holder 122 and firmly fixed thereto.

Base part 21 includes a pair of wall parts 211 and 212. The pair of wall parts 211 and 212 is disposed upright to face each other at both ends of plate-shaped bottom portion 213 in the axis direction. Base part 21 is formed in a substantially U-shape in cross section.

In the pair of wall parts 211 and 212, insertion holes 211a and 212a, respectively to which rotation shaft 13 is inserted are formed. In addition, in the pair of wall parts 211 and 212, cutout holes 211b and 212b, respectively that communicate between the outer edges of the pair of wall parts 211 and 212 and insertion holes 211a and 212a are formed.

In this manner, rotation shaft 13 can be disposed at the position of insertion holes 211a and 212a through cutout holes 211b and 212b, with mirror part 12 firmly fixed to rotation shaft 13. In the case where cutout holes 211b and 212b are not provided, rotation shaft 13 is inserted to both insertion hole 122a of mirror holder 122 and insertion holes 211a and 212a of the pair of wall parts 211 and 212, with mirror part 12 disposed between the pair of wall parts 211 and 212. Further, it is necessary to perform complicated assembling operation of firmly fixing rotation shaft 13 and mirror holder 122. Conversely, in the present embodiment, since cutout holes 211b and 212b are formed, rotation shaft 13 to which mirror part 12 is firmly fixed in advance can be easily inserted to insertion holes 211a and 212a.

In the pair of wall parts 211 and 212, bearings 22 and 23 are attached to the attaching portion (omitted in the drawing) provided at insertion holes 211a and 212a. Bearings 22 and 23 may be composed of a plain bearing or a roll bearing (for example, a ball bearing) for base part 21. For example, when bearings 22 and 23 are composed of roll bearings, the coefficient of friction is low and rotation shaft 13 can smoothly rotate, which improves the driving performance of rotary reciprocating driving actuator 1. In this manner, rotation shaft 13 is rotatably attached to base part 21 through bearings 22 and 23, and mirror part 12, which is a movable object, is disposed between the pair of wall parts 211 and 212.

Bearings 22 and 23 are inserted from both sides in the axis direction of rotation shaft 13, and are attached to the bearing attaching portion provided at insertion holes 211a and 212a after rotation shaft 13 is disposed at insertion holes 211a and 212a. In this manner, rotation shaft 13 is rotatably attached to base part 21 through bearings 22 and 23.

Note that magnet 32 is firmly fixed at one end of rotation shaft 13. Magnet 32 is disposed in driving part 30 described later, and driven into reciprocation rotation by the magnetic flux generated by driving part 30.

In this manner, in the present embodiment, rotation shaft 13 where mirror part 12, which is a movable object, is attached is axially supported by the pair of wall parts 211 and 212 of base part 21 to support mirror part 12 from both sides. In this manner, the support of mirror part 12 is strengthened and the impact resistance and vibration proofness increase in comparison with the case where rotation shaft 13 is axially supported in a cantilever manner.

Driving Part 30

As illustrated in FIG. 2 and FIG. 3, driving part 30 includes core assembly 4 including core member 40 and coils 44 and 45, and magnet 32.

Core Assembly 4

Figure 4:
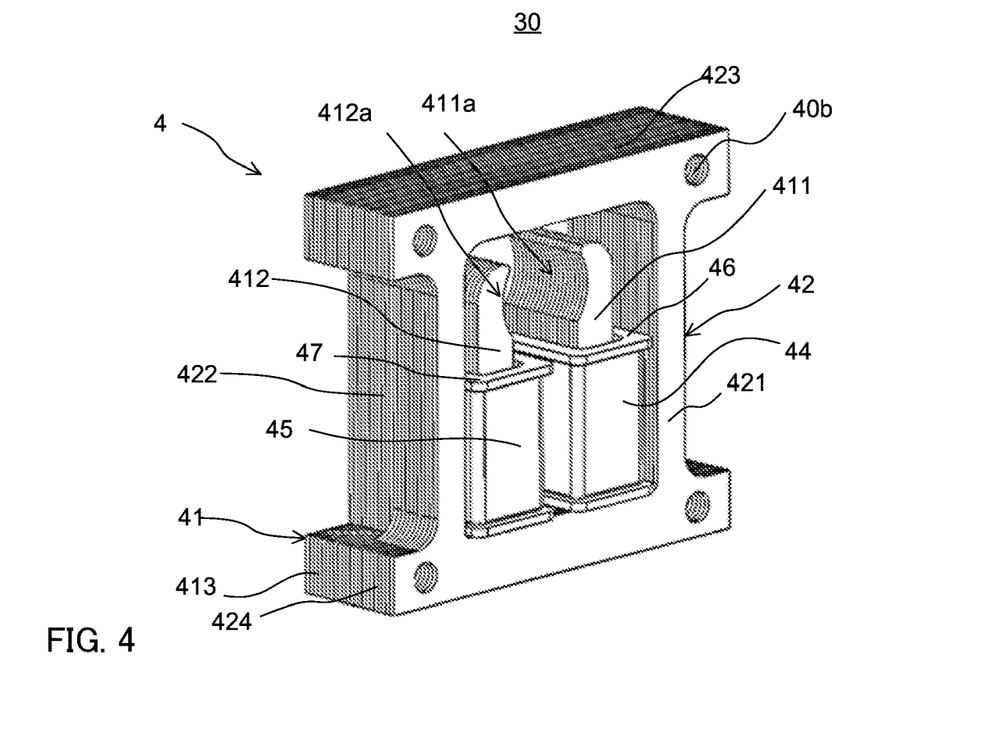
FIG. 4 is a perspective view illustrating a configuration of a core assembly.

FIG. 4 is a perspective view illustrating a configuration of core assembly 4 (except for first case 51, second case 52 and first bearing 53).

Core assembly 4 illustrated in FIG. 3 and FIG. 4 includes, in addition to core member 40 and coils 44 and 45, rotation angle position holding part 48, first case 51, second case 52, first bearing 53 and the like.

Core assembly 4 is fixed to base part 21, and makes up a part of fixing body 20. In the present embodiment, core assembly 4 is formed in a rectangular plate shape in which magnetic poles 411a and 412a are arranged.

Core Member 40

Core member 40 includes magnetic pole core 41 with an integral structure including a plurality of magnetic poles 411a and 412a, and magnetic path core 42 that is magnetically coupled and integrated with magnetic pole core 41 and makes up a magnetic path together with magnetic pole core 41.

Magnetic pole core 41 and magnetic path core 42 pass, through the plurality of magnetic poles 411a and 412a, the magnetic flux that is generated when coils 44 and 45 are energized. Magnetic pole core 41 and magnetic path core 42 are lamination cores obtained by stacking electromagnetic steel sheets (laminate member) such as silicon steel sheets, for example. With core member 40 with the lamination structure, magnetic pole core 41 and magnetic path core 42 with a complicated shape can be configured in a cost-effective manner.

Figure 5:
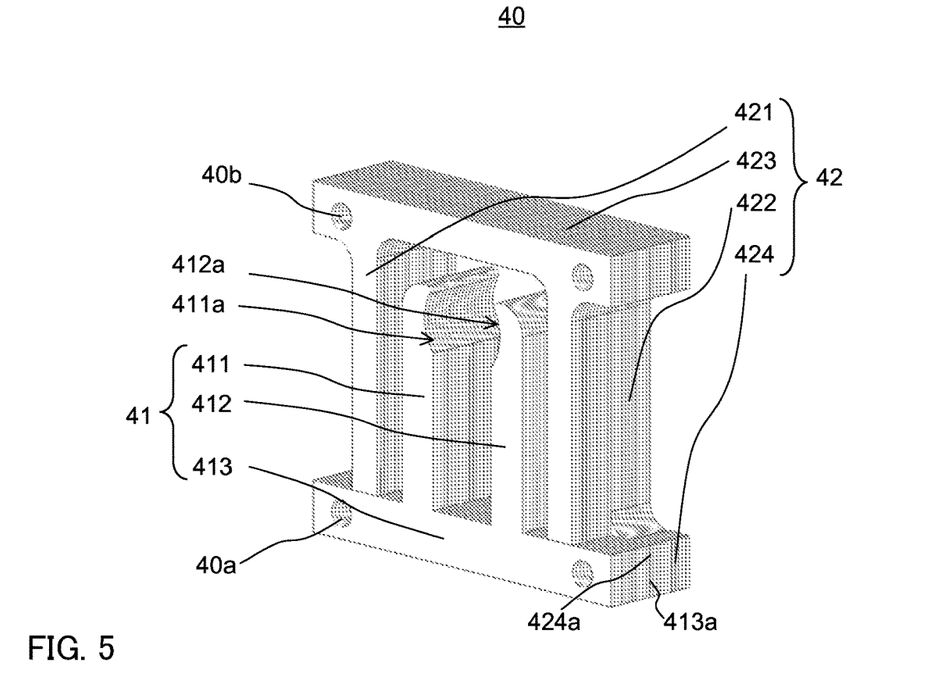
FIG. 5 is a left perspective view illustrating a configuration of a core part of a core member.
Figure 6:
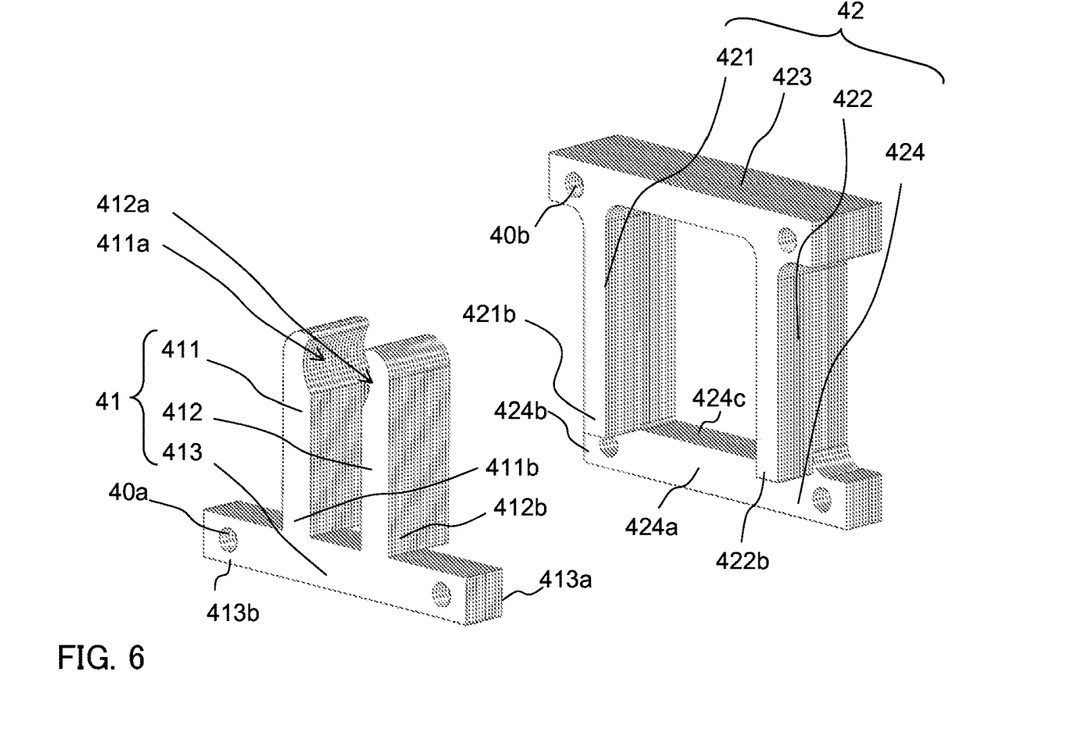
FIG. 6 is an exploded view of the core part illustrated in FIG. 5.

FIG. 5 is a left perspective view illustrating a configuration of a core part of a core member, and FIG. 6 is an exploded view of the core part illustrated in FIG. 5.

Magnetic Pole Core 41

Magnetic pole core 41 includes a plurality of rod members 411 and 412 with the plurality of magnetic poles 411a and 412a at respective end portions, and connection member 413, in an integral structure.

Rod members 411 and 412 extend in parallel with each other from base end portions 411b and 412b to the top end portions (including magnetic poles 411a and 412a), and a plurality of coils 44 and 45 are inserted outside respective intermediate portions.

When excited through energization of coils 44 and 45, magnetic poles 411a and 412a at the end portions of rod members 411 and 412 have the polarity corresponding to the energization direction. Rod members 411 and 412, with the same thickness as the thickness (the length in the extending direction of rotation shaft 13) of core member 40, is provided with the left side surface flush with connection member 413 and the right side surface protruded than connection member 413. Note that the protruding portion of rod member 411 at the right side surface is disposed inside magnetic path core 42.

The portions opposite to magnet 32 in magnetic poles 411a and 412a have shapes curved along the outer peripheral surface of magnet 32. The curved shapes are disposed to face each other in the direction orthogonal to the extending directions of rod members 411 and 412, for example. Magnetic poles 411a and 412a have outer sizes that allow for insertion of bobbins 46 and 47 around which coils 44 and 45 are wound, outside them from the top end side, for example. In this manner, from the top end side in the extending directions of rod members 411 and 412, that is, the top ends of magnetic poles 411a and 412a, bobbins 46 and 47 can be inserted outside up to the position surrounding rod members 411 and 412.

Connection member 413 extends in the direction that intersects the arrangement direction of rod members 411 and 412 at the base end portions of rod members 411 and 412, and connects rod members 411 and 412. Connection member 413 is formed in a rectangular columnar shape and extends in the direction orthogonal to the arrangement direction of rod members 411 and 412 in such a manner as to orthogonally laterally protrude from base end portions 411b and 412b of rod members 411 and 412.

Mainly, connection member 413 forms a magnetic path that connects the base end portions 411b and 412b of rod members 411 and 412, and base end portions 421b and 422b of leg parts 421 and 422 of magnetic path core 42. The top end portion of the protruding portion at connection member 413 includes core fixing piece part 413b for fixing magnetic pole core 41 and magnetic path core 42, and mounting hole 40a is provided at core fixing piece part 413b.

Fastening member 61 is inserted to mounting hole 40a, and fixed through magnetic path core 42, and in turn, each mounting hole of first case 51 or second case 52 described later.

Connection member 413 includes a planar magnetic pole side contact surface 413a that makes surface contact with magnetic path side contact surface 424a of magnetic path core 42. Magnetic pole side contact surface 413a is provided at the entire surface of the portion that faces magnetic path core 42 in connection member 413. Connection member 413 is joined in the entirely stacked state at magnetic path side connection member 424 of magnetic path core 42, by joining magnetic pole side contact surface 413a in surface contact with magnetic path side contact surface 424a of magnetic path core 42.

Since rod members 411 and 412 and connection member 413 have an integral structure in magnetic pole core 41, the positional relationship of the plurality of magnetic poles 411a and 412a does not change when assembling rotary reciprocating driving actuator 1.

Specifically, in the case where driving part 30 is disposed such that magnetic poles 411a and 412a are disposed at positions facing face magnet 32 as a core member of core assembly 4 together with magnetic path core 42, magnetic pole 411 and 412 can be disposed at precise positions facing each other with no shift therebetween.

Magnetic Path Core 42

Magnetic path core 42 is connected to magnetic pole core 41, and forms a magnetic path through which the magnetic flux passes at magnetic poles 411a and 412a when coils 44 and 45 are energized.

Magnetic path core 42 is assembled with magnetic pole core 41 in the state where it faces and makes surface contact with connection member 413 in the extending direction of rotation shaft 13 and the plurality of magnetic poles 411a and 412a are positioned around rotation shaft 13.

Together with connection member 413, magnetic path core 42 makes up a magnetic path disposed at the periphery of rotation shaft 13 so as to surround magnetic poles 411a and 412a and coils 44 and 45. Specifically, magnetic path core 42 includes a surrounding part that surrounds coils 44 and 45, and makes surface contact with connection member 413 of magnetic pole core 41 at a part (magnetic path side connection member 424) of the surrounding part. With this configuration, magnetic path core 42 has a high strength, and can stably set the position of magnetic poles 411a and 412a. In addition, since magnetic path core 42 surrounds coils 44 and 45 in an annular form, the external contact with coils 44 and 45 can be prevented.

Magnetic path core 42 connects to connection member 413 to connect the base end portions 411b and 412b of rod members 411 and 412 of magnetic pole core 41 and base end portions 421b and 422b of leg parts 421 and 422. Through this connection, the surrounding part of magnetic path core 42, together with connection member 413, forms a magnetic circuit that surrounds magnetic poles 411a and 412a, coils 44 and 45, and magnet 32, and connects magnetic poles 411a and 412a.

The surrounding part of magnetic path core 42 includes magnetic path side connection member 424 that makes surface contact with magnetic pole side contact surface 413a of connection member 413, leg parts 421 and 422, and bridge part 423. Magnetic path side connection member 424 connects between base end portions 421b and 422b of a pair of leg parts 421 and 422. In connection member 413 and magnetic path side connection member 424, the pair of leg parts 421 and 422 is connected at the portion extending outside rod members 411 and 421, specifically at the both end portions, in a contact state in a manner upright from one surfaces of connection member 413 and 424. In this manner, in connection member 413, the magnetic flux passes, from both end portions, through the pair of leg part, bridge part 423, and then rod member 411, magnet 32, and rod member 412.

Magnetic path side connection member 424 includes magnetic path side contact surface 424a that faces connection member 413, and makes contact with the entire surface of magnetic pole side contact surface 413a of connection member 413 in an overlapping manner, at magnetic path side contact surface 424a. Magnetic path side connection member 424 can reduce the magnetic resistance at the joining portion of magnetic pole side contact surface 413a of connection member 413.

Leg parts 421 and 422 extend separately from each other along the arrangement direction of a pair of rod members 411 and 412 with the pair of rod members 411 and 412 therebetween. Leg parts 421 and 422 are extended in the direction that intersects magnetic path side connection member 424 from the both end portions of magnetic path side connection member 424 at base end portions 421b and 422b, and are joined. The top end portions of leg parts 421 and 422 are bridged with bridge part 423.

Leg parts 421 and 422 are formed to have a thickness (the length in the extending direction of rotation shaft 13) that is equal to the sum of the thicknesses of bridge part 423, rod members 411 and 412, connection member 413 and magnetic path side connection member 424, for example. Preferably, in leg parts 421 and 422, the end surface of base end portions 421b and 422b raised from magnetic path side connection member 424 is formed to make surface contact with connection member 413.

Bridge part 423 is disposed in parallel with magnetic path side connection member 424. Bridge part 423 is disposed in a rectangular frame shape together with magnetic path side connection member 424 joined to connection member 413, and leg parts 421 and 422 disposed in parallel with each other with the base end portions joined to magnetic path side connection member 424.

Note that the corner portion (the coupling portion between leg parts 421 and 422 and bridge part 423), which is the bent portion of the magnetic path in magnetic path core 42 may have a rounded R-shape or a linearly bent shape. In addition, in the present embodiment, rotation angle position holding part 48 is provided at bridge part 423.

In the present embodiment, leg parts 421 and 422 are connected to abut bridge part 423. In bridge part 423, mounting hole 40b is provided at the portion protruding to both sides from the joining portion of leg parts 421 and 422. Fastening member 61 is inserted to mounting hole 40b together with mounting hole 40a, and, with fastening member 61, core assembly 4 is fixed to base part 21 when rotary reciprocating driving actuator 1 is assembled.

In the state where rotary reciprocating driving actuator 1 is assembled, rotation shaft 13 is inserted to the space surrounded by magnetic poles 411a and 412a. In addition, magnet 32 attached to rotation shaft 13 is located in this space, and magnetic poles 411a and 412a face each other with air gap G therebetween at a precise position with respect to magnet 32.

Coils 44 and 45 are wound around cylindrical bobbins 46 and 47. A coil member composed of coils 44 and 45 and bobbins 46 and 47 is inserted outside rod members 411 and 412 of magnetic pole core 41, and thus coils 44 and 45 are disposed around rod members 411 and 412. In this manner, coils 44 and 45 are disposed in an adjacent manner at magnetic poles 411a and 412a at the end portions of rod members 411 and 412.

The winding direction of coils 44 and 45 is set such that a favorable magnetic flux is generated from one of magnetic poles 411a and 412a of magnetic pole core 41 to the other when energization is performed.

Rotation Angle Position Holding Part (Magnet Position Holding Part) 48

In the state where rotary reciprocating driving actuator 1 is assembled, rotation angle position holding part 48 is incorporated to core assembly 4 so as to face magnet 32 with air gap G therebetween. Rotation angle position holding part 48 is attached at bridge part 423 (a portion on the upper side of rod members 411 and 412 of magnetic pole core 41) of magnetic path core 42 in a posture in which the magnetic pole is opposite to magnet 32, for example.

Rotation angle position holding part 48, which is composed of magnet 32, generates a magnetic attractive force together with magnet 32 and attracts magnet 32, for example. Specifically, together with rod members 411 and 412, rotation angle position holding part 48 forms a magnetic spring between it and magnet 32. With this magnetic spring, in a normal state (non-energization state) where coils 44 and 45 are not energized, the rotation angle position of magnet 32, i.e., the rotation angle position of rotation shaft 13 is held at a neutral position.

The neutral position is magnet 32 is the reference position of reciprocation rotation, that is, the center of sway. When magnet 32 is held at a neutral position, boundary portions 32c and 32d of magnet 32 face straight magnetic poles 411a and 412a of rod members 411 and 412. In addition, the attaching posture of mirror part 12 is adjusted with respect to the state where magnet 32 is located at the neutral position. Note that rotation angle position holding part 48 may be composed of a magnetic substance that generates a magnetic attractive force between it and magnet 32.

First case 51 and second case 52 are composed of an electrical conducting material, and function as electromagnetic shields. First case 51 and second case 52 are disposed on both sides in the axis direction of core member 40. First case 51 and second case 52 can suppress the incidence of noise from the outside to core member 40 and emission of noise from core member 40 to the outside.

Preferably, first case 51 and second case 52 are formed of aluminum alloy. Aluminum alloy has a high degree of freedom in design, and can readily provide desired rigidity. Accordingly, it is suitable for the case where first case 51 functions as a supporting body for supporting rotation shaft 13.

Rotation shaft 13 is rotatably attached to first case 51 through first bearing 53. First bearing 53 is disposed at a bearing attaching portion continuous from at through hole 51a formed in first case 51. The bearing attaching portion is formed in a recessed shape on the rear surface side of first case 51 and is continuous from through hole 51a, for the fitting in the recessed shape, for example. First bearing 53 rotatably and readily attaches, to first case 51, the end portion of rotation shaft 13 on the side on which magnet 32 is disposed. Note that first bearing 53 is a roll bearing or a plain bearing, and has the same function as that of bearings 22 and 23, for example. First bearing 53 supports rotation shaft 13 such that it can reciprocate and rotate, on both sides of magnet 32 together with bearing 22 of wall part 211.

Second case (joining member) 52 positions and joins core assembly 4 to wall part 211 of base part 21. Second case 52 is integrally fixed with first case 51 through fastening member 61 with core member 40 therebetween, and positioned and fixed to wall part 211 through fastening member 62.

Second case 52 includes insertion hole 52a larger than the external shape of magnet 32. Rotation shaft 13 with magnet 32 mounted is inserted into core assembly 4 through insertion hole 52a of second case 52.

Core member 40 composed of magnetic pole core 41 and magnetic path core 42 is sandwiched by first case 51 and second case 52, and fixed by fastening member 61 so as to be integrated with core assembly 4. In addition, core assembly 4 is fixed to left side wall part 211 of base part 21 with fastening member 62, and integrated with base part 21.

Magnet 32 is a ring magnet with S pole 32a and N pole 32b alternately disposed in the circumferential direction. Magnet 32 is attached to the peripheral surface of rotation shaft 13 so as to be located in the space surrounded by magnetic poles 411a and 412a of core member 40 in the state where rotary reciprocating driving actuator 1 is assembled. When coils 44 and 45 are energized, rod members 411 and 412 and magnetic path core 42 are excited, the polarity corresponding to the energization direction is generated at magnetic poles 411a and 412a, and a magnetic force (suction force and resilience) is generated between magnet 32 and magnetic poles 411a and 412a.

In the present embodiment, magnet 32 is magnetized in different polarities with the plane along the axis direction of rotation shaft 13 as the boundary. That is, magnet 32 is a two-pole magnet evenly magnetized into S pole 32a and N pole 32b. The number of the magnetic poles of magnet 32 (in the present embodiment, two) is equal to the number of magnetic poles 411a and 412a of core member 40. Note that magnet 32 may be magnetized into two or more poles in accordance with the amplitude during the movement. In this case, the magnetic pole part of core member 40 is provided corresponding to the magnetic pole of magnet 32.

The polarity of magnet 32 is switched at boundary portions 32c and 32d (hereinafter referred to as "magnetic pole switching part") between S pole 32a and N pole 32b. Magnetic pole switching parts 32c and 32d face magnet 32 magnetic poles 411a and 412a, respectively, straight when held at a neutral position.

At the neutral position, magnetic pole switching parts 32c and 32d of magnet 32 face magnetic poles 411a and 412a straight, and thus driving part 30 can stably drive movable member 10 by generating the maximum torque. In addition, with magnet 32 configured as a two-pole magnet, the movable object can be easily driven at a high amplitude in conjunction with core member 40, and the driving performance can be improved. Note that while magnet 32 includes a pair of magnetic pole switching parts 32c and 32d in the embodiment, two pairs or more magnetic pole switching parts may be provided.

Note that in driving part 30, the part of rotation shaft 13 where magnet 32 is disposed is supported at two points by first case 51 and left side wall part 211, and therefore the linearity of rotation shaft 13 can be ensured even when the magnetic attractive force between magnet 32 and rotation angle position holding part 48 becomes large. Specifically, in the case where the part of rotation shaft 13 where magnet 32 is disposed is supported by only left side wall part 211 in a cantilever manner, rotation shaft 13 may be deflected to rotation angle position holding part 48 side and the linearity may be reduced when the magnetic attractive force between magnet 32 and rotation angle position holding part 48 becomes large; however, such a problem is not caused.

Figure 7:
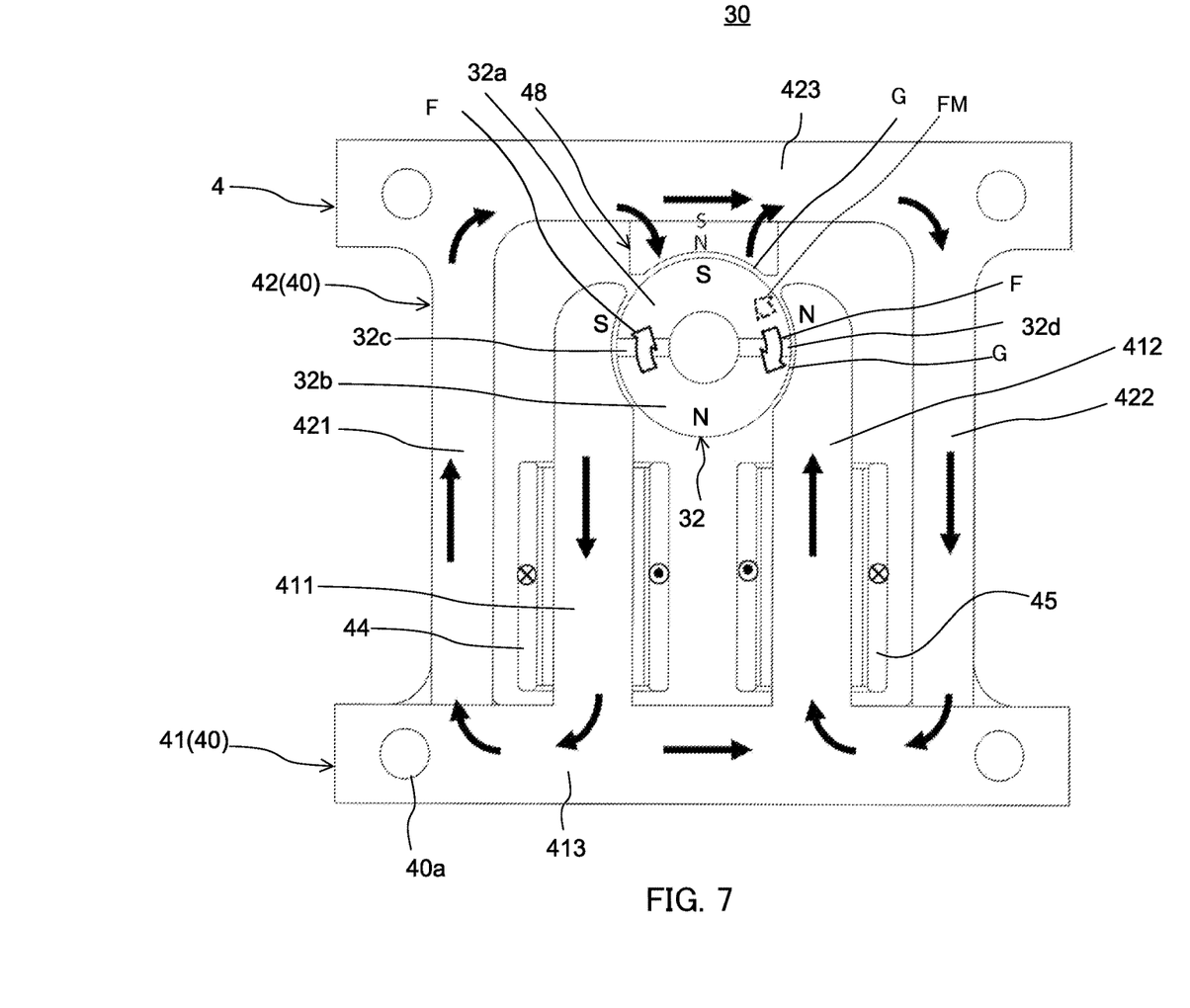
FIG. 7 is a diagram illustrating an operation of a magnetic circuit of the rotary reciprocating driving actuator.
Figure 8:
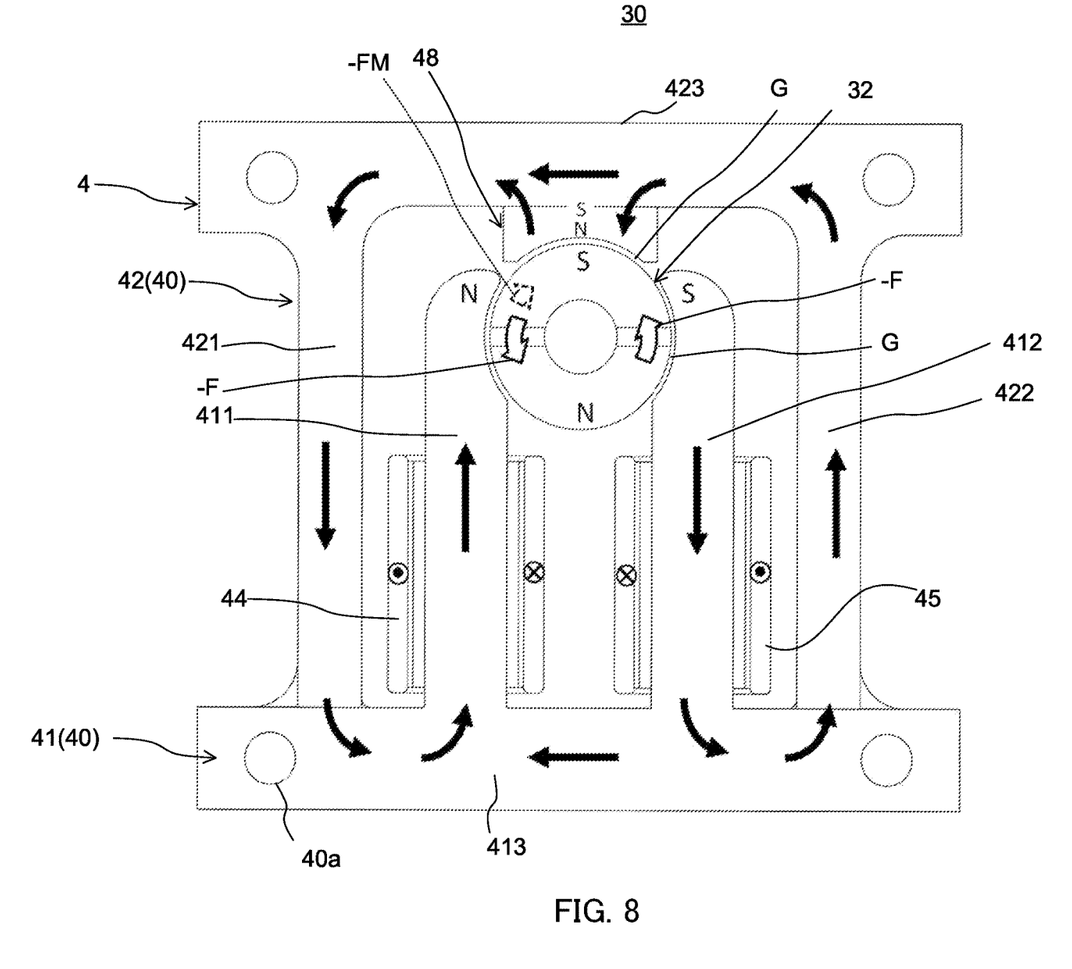
FIG. 8 is a diagram illustrating an operation of the magnetic circuit of the rotary reciprocating driving actuator.

Next, an operation of rotary reciprocating driving actuator 1 is described with reference to FIGS. 3, 7, and 8. FIG. 7 and FIG. 8 are diagrams for describing an operation of the magnetic circuit of rotary reciprocating driving actuator 1.

Two magnetic poles 411a and 412a of core member 40 of core assembly 4 are disposed to sandwich magnet 32 with air gap G therebetween. As illustrated in FIG. 3, in the non-energization state of coils 44 and 45, magnet 32 is held at a neutral position with the magnetic attractive force between it and rotation angle position holding part 48.

At the neutral position, one of S pole 32a and N pole 32b (in FIG. 7, S pole 32a) of magnet 32 is attracted by rotation angle position holding part 48 (see magnetic spring torque FM in FIG. 7). At this time, magnetic pole switching parts 32c and 32d face the center position of magnetic poles 411a and 412a of core member 40.

When coils 44 and 45 are energized, core member 40 is excited, and the polarity corresponding to the energization direction is generated at magnetic poles 411a and 412a. When coils 44 and 45 are energized as illustrated in FIG. 7, a magnetic flux is generated inside core member 40, and magnetic pole 411a and magnetic pole 412a become the S pole and the N pole, respectively. In this manner, magnetic pole 411a magnetized to the S pole is attracted by N pole 32b of magnet 32, and magnetic pole 412a magnetized to the N pole is attracted by S pole 32a of magnet 32. Then, the torque in the F direction is generated around the axis of rotation shaft 13 in magnet 32, and magnet 32 is rotates in the F direction. Along with this, rotation shaft 13 also rotates in the F direction, and mirror part 12 fixed to rotation shaft 13 also rotates in the F direction.

Next, as illustrated in FIG. 8, when coils 44 and 45 are energized in an opposite manner, the magnetic flux generated inside core member 40 flows in the opposite direction, and magnetic pole 411a and magnetic pole 412a become the N pole and the S pole, respectively. Magnetic pole 411a magnetized to the N pole is attracted by S pole 32a of magnet 32, and magnetic pole 412a magnetized to the S pole is attracted by N pole 32b of magnet 32. Then, torque −F opposite to the F direction is generated around the axis of rotation shaft 13 in magnet 32, and magnet 32 rotates in the −F direction. Along with this, rotation shaft 13 is also rotated, and mirror part 12 fixed to rotation shaft 13 is also rotated. Rotary reciprocating driving actuator 1 drives mirror part 12 into reciprocation rotation by repeating the above-described operation.

Figure 9:
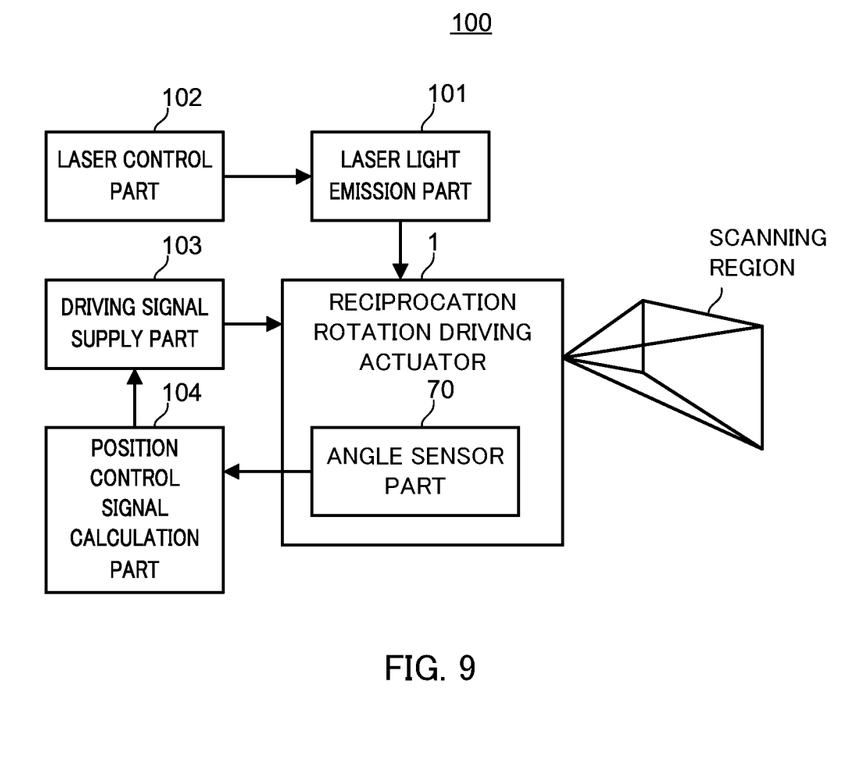
FIG. 9 is a diagram illustrating a configuration of a main part of a scanner system using the rotary reciprocating driving actuator.

In practice, rotary reciprocating driving actuator 1 is driven by alternating current waves input to coils 44 and 45 from the power supply part (which corresponds to driving signal supply part 103 of FIG. 9, for example). That is, the energization direction of coils 44 and 45 is cyclically switched. When the energization direction is switched, magnet 32 is biased to return to the neutral position by the magnetic attractive force between rotation angle position holding part 48 and magnet 32, i.e., the restoration force of the magnetic spring (magnetic spring torques FM and −FM illustrated in FIG. 7 and FIG. 8). In this manner, a torque in the F direction and the torque in the direction (−F direction) opposite to the F direction around the axis alternately act on movable member 10. In this manner, movable member 10 is driven into reciprocation rotation.

The driving principle of rotary reciprocating driving actuator 1 is briefly described below. In rotary reciprocating driving actuator 1 of the present embodiment, the movable member vibrates (rotates back and forth) with respect to the fixing body (fixing body 20) at resonance frequency $F_r$ [Hz] calculated by Equation 1, where the inertia moment of movable member (movable member 10) is J [kg·m²] and the spring constant of the twisting direction of the magnetic spring (magnetic poles 411a and 412a, rotation angle position holding part 48 and magnet 32) is $K_{sp}$.

(Equation 1)

$$Fr = \frac{1}{2\pi}\sqrt{\frac{K_{sp}}{J}} \quad [1]$$

$F_r$: resonance frequency [Hz]
J: inertia moment [kg·m²]
$K_{sp}$: spring constant [Nm/rad]

Since the movable member makes up a mass part of a vibration model of a spring-mass system, the movable member is put in a resonance state when alternating current waves of a frequency equal to resonance frequency $F_r$ of the movable member are input to coils 44 and 45. That is, by inputting alternating current waves of a frequency substantially equal to resonance frequency $F_r$ of the movable member from the power supply part to coils 44 and 45, the movable member can be efficiently vibrated.

An equation of motion and a circuit equation representing the driving principle of rotary reciprocating driving actuator 1 are described below. Rotary reciprocating driving actuator 1 is driven based on the equation of motion expressed by Equation 1 and the circuit equation expressed by Equation 3.

(Equation 2)

$$J\frac{d^2\theta(t)}{dt^2} = K_t i(t) - K_{sp}\theta(t) - D\frac{d\theta(t)}{dt} - T_{Loss} \quad [2]$$

J: inertia moment [kg·m²]
θ(t): angle [rad]
$K_t$: torque constant [Nm/A]
I(t): current [A]
$K_{sp}$: spring constant [Nm/rad]
D: attenuation coefficient [Nm/(rad/s)]
$T_{LOSS}$: load torque [Nm]

(Equation 3)

$$e(t) = Ri(t) + L\frac{di(t)}{dt} + K_e\frac{d\theta(t)}{dt} \quad [3]$$

E(t): voltage [V]
R: resistance [Ω]
L: inductance [H]
$K_e$: counterelectromotive force constant [V/(rad/s)]

Specifically, inertia moment J [kg·m²], rotation angle θ(t)[rad], torque constant $K_t$ [N·m/A], current i(t) [A], spring constant $K_{sp}$ [Nm/rad], attenuation coefficient D [N·m/(rad/s)], load torque $T_{Loss}$ [N·m] and the like of the movable member in rotary reciprocating driving actuator 1 can be appropriately changed as long as Equation 2 is satisfied. In addition, voltage e(t) [V], resistance R [Ω], inductance L [H], and counterelectromotive force constant $K_e$ [V/(rad/s)] can be appropriately changed as long as Equation 3 is satisfied.

In this manner, when the coil is energized with alternating current waves corresponding to resonance frequency $F_r$ determined by inertia moment J of the movable member and spring constant Ksp of the magnetic spring, rotary reciprocating driving actuator 1 can acquire an efficient large vibration output.

Note that rotary reciprocating driving actuator 1 may include angle sensor part 70 that detects the rotation angle of rotation shaft 13 (see FIG. 6). Angle sensor part 70 is fixed to wall part 212 on the right side of base part 21, for example.

Angle sensor part 70 includes an optical sensor and an encoder disk, for example. The encoder disk is attached to rotation shaft 13 and rotates integrally with magnet 32 and mirror part 12. That is, the rotation position of the encoder disk is the same as the rotation position of rotation shaft 13. The optical sensor emits light to the encoder disk and detects the rotation position (angle) of the encoder disk based on its reflection light. In this manner, the rotation positions of magnet 32 and mirror part 12 can be detected.

With angle sensor part 70, the rotation angle of movable member 10 including magnet 32 and rotation shaft 13 can be detected, and the movable member during the driving, or more specifically, the rotation angle position and rotational speed of mirror part 12, which is a movable object, can be controlled.

FIG. 9 is a block diagram illustrating a configuration of a main part of scanner system 100 using rotary reciprocating driving actuator 1.

Scanner system 100 includes, in addition to rotary reciprocating driving actuator 1, laser light emission part 101, laser control part 102, driving signal supply part 103 and position control signal calculation part 104.

Laser light emission part 101 includes a laser diode (LD) serving as a light source, a lens system for converging laser light output from that light source and the like, for example. Laser control part 102 controls laser light emission part 101. The laser light emitted from laser light emission part 101 impinges on mirror 121 of rotary reciprocating driving actuator 1.

With reference to the target angle position and the angle position of rotation shaft 13 (mirror 121) acquired by angle sensor part 70, position control signal calculation part 104 generates a driving signal for controlling rotation shaft 13 (mirror 121) such that it is set to the target angle position. For example, position control signal calculation part 104 generates a position control signal on the basis of the acquired angle position of rotation shaft 13 (mirror 121) and a signal indicating the target angle position converted using saw waveform data stored in the waveform memory not illustrated in the drawing and the like, and outputs the position control signal to driving signal supply part 103.

On the basis of the position control signal, driving signal supply part 103 supplies, to coils 44 and 45 of rotary reciprocating driving actuator 1, a driving signal for setting the angle position of rotation shaft 13 (mirror 121) to a desired angle position. In this manner, scanner system 100 can emit scanning light from rotary reciprocating driving actuator 1 to a predetermined scanning region.

Overview

As described above, rotary reciprocating driving actuator 1 according to the present embodiment includes movable member 10 including rotation shaft (shaft part) 13 to which mirror part (movable object) is connected and magnet 32 fixed to rotation shaft 13. Note that magnet 32 is a ring magnet in which S pole 32a and N pole 32b are alternately disposed in the circumferential direction at the outer peripheral surface. Additionally, rotary reciprocating driving actuator 1 includes fixing body 20 including core assembly 4.

Core assembly 4 includes core member 40 including magnetic pole core 41 with an integral structure including the plurality of magnetic poles 411a and 412a and magnetic path core 42, and the plurality of coils 44 and 45 disposed next to the plurality of magnetic poles 411a and 412a, respectively. Magnetic path core 42 is a member separated from magnetic pole core 41 and is magnetically coupled with magnetic pole core 41 to form a magnetic path together with magnetic pole core 41. Magnetic pole core 41 is disposed such that the plurality of magnetic poles 411a and 412a faces the outer periphery of magnet 32. Magnetic poles 411a and 412a and the outer peripheral surface of magnet 32 are disposed to face each other with air gap G therebetween.

Core member 40 is composed of separate members, magnetic pole core 41 and magnetic path core 42, and magnetic poles 411a and 412a have an integral structure at a position facing the outer periphery of magnet 32 in magnetic pole core 41, and thus it can be readily manufactured without reducing the installation accuracy of the plurality of magnetic poles 411a and 412a even in the case where core member 40 including magnetic pole core 41 and magnetic path core 42 has a complex shape.

Note that the number of magnetic poles of magnet 32 and the number of magnetic poles 411a and 412a are equal to each other. Fixing body 20 includes rotation angle position holding part (magnet position holding part) 48 that faces magnet 32 with air gap G therebetween. Rotation angle position holding part 48 holds magnet 32 at the reference position, i.e., holds the rotation angle position of magnet 32 or rotation shaft 13 at the neutral position, by the magnetic attractive force generated between it and magnet 32. The reference position is the rotation center position of the reciprocation rotation of magnet 32.

By switching the energization direction of the plurality of coils 44 and 45, the flow of the magnetic flux passing through magnetic path core 42 and magnetic pole core 41 with an integral structure is generated in a switching manner at core assembly 4, and thus movable member 10 rotates back and forth around the axis of rotation shaft 13 through the electromagnetic interaction between magnetic flux and magnet 32.

Magnetic pole core 41 and magnetic path core 42 are laminate members, which are less time-consuming to manufacture, and therefore magnetic pole core 41 and magnetic path core 42 with complicated shapes can be formed in a cost-effective manner. Magnetic pole core 41 includes a plurality of rod members 411 and 412, and connection member 413 that connects a plurality of rod members 411 and 412 in an integral structure. The plurality of rod members 411 and 412, which include the plurality of magnetic poles 411a and 412a at respective end portions, are extended from base end portions 411b and 412b to the top end portions in parallel with each other. The plurality of coils 44 and 45 are inserted outside the respective intermediate portions of the plurality of rod members 411 and 412. Connection member 413 extends in the direction that intersects the arrangement direction of rod members 411 and 412 at base end portions 411b and 412b.

Magnetic path core 42 faces connection member 413 in the extending direction of rotation shaft 13 so as to make surface contact with each other, and magnetic pole core 41 is assembled to it such that the plurality of magnetic poles 411a and 412a is positioned around rotation shaft 13 with coils 44 and 45 adjacent to each other.

In this manner, even the core including magnetic poles 411a and 412a facing each other with magnet 32 therebetween can be disposed without variation while achieving high output, reducing the manufacturing cost, and increasing the installation accuracy of magnetic poles 411a and 412a. Thus, the reliability of rotary reciprocating driving actuator 1 can be improved.

In addition, magnetic path core 42 includes an extending part (leg parts 421 and 422 and bridge part 423) extending outside rod members 411 and 412, and the extending part is disposed at the periphery of rotation shaft 13 so as to surround coils 44 and 45 together with connection member 413. In this manner, the electromagnetic noise generated from energized coils 44 and 45 can be suppressed. Further, leakage magnetic flux from coils 44 and 45 and magnet 32 can be suppressed, and electromagnetic influence to the external device can be prevented.

In addition, in the case where rotation angle position holding parts 48, 48A and 48B are magnets, the movable member can be more correctly set to the reference position for the reciprocation rotation driving of the movable member, and can be reliably reciprocated from that position.

In addition, the movable object is mirror part 12 that reflects scanning light (in particular, mirror 121). In this manner, rotary reciprocating driving actuator 1 can be used for scanners for optical scanning.

The invention made by the present inventor has been described specifically based on the above embodiments. The invention is not limited to the above embodiments, but can be modified to the extent not to depart from the gist thereof.

For example, while the movable object is mirror part 12 in the embodiment, the movable object is not limited to this. The movable object may be an image pickup device such as a camera, for example.

In addition, for example, rotary reciprocating driving actuator 1 is driven resonantly in the embodiment, but the present invention may be applied to a case in which the actuator is driven non-resonantly.

In addition, the configuration of driving part 30 is not limited to that described in the embodiment. For example, it suffices that the core includes a magnetic pole part that generates a polarity when excited through energization of the coil, and that the magnetic pole part and the outer peripheral surface of the magnet face each other with an air gap therebetween when the rotation shaft is attached to the fixing body. In addition, it suffices that the coil is configured to favorably generate a magnetic flux from one side to the other of the magnetic pole part of the core when it is energized.

Further, while rotation angle position holding part 48 provided at fixing body 20 is attached to bridge part 423 of magnetic path core 42 in core assembly 4, this is not limitative, and it may be provided to other components of fixing body 20 as illustrated in FIG. 10 to FIG. 14. In addition, in the above-mentioned cases, rotation angle position holding part 48 may be housed in crosslinking part 423.

Figure 10:
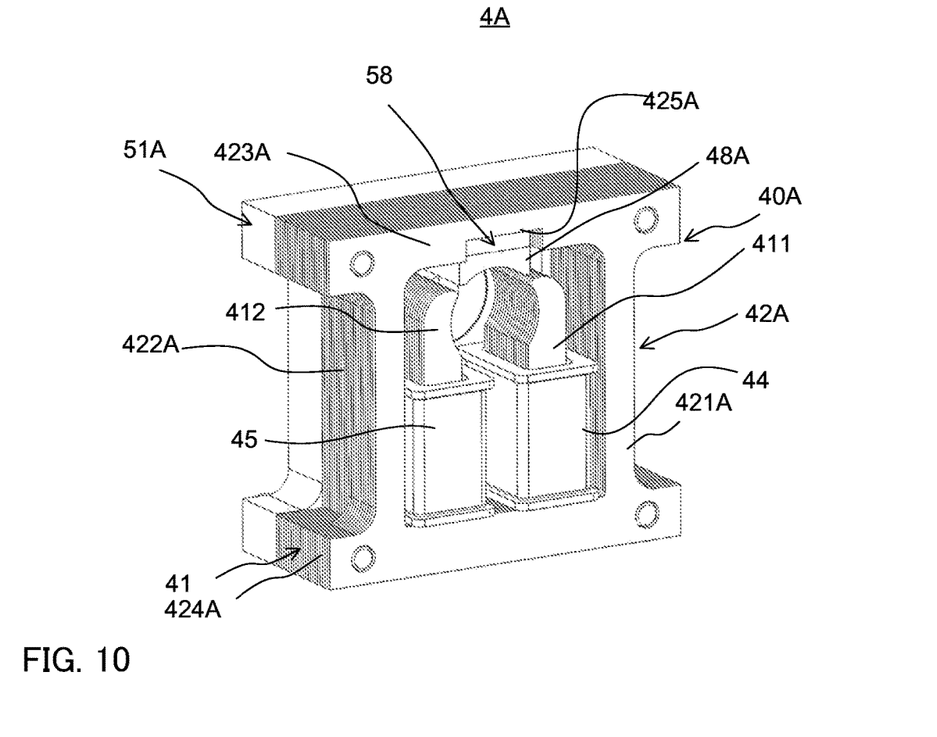
FIG. 10 is a perspective view illustrating a configuration of a core assembly of Modification 1.
Figure 11:
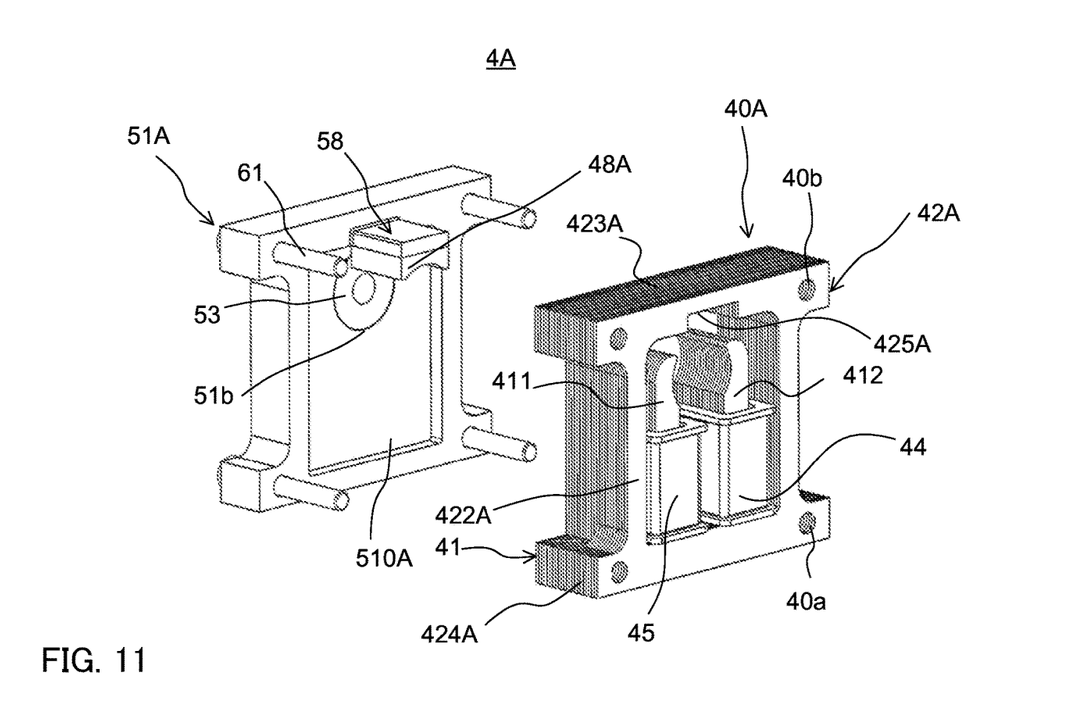
FIG. 11 is a perspective view illustrating a state where is a first case is detached from a coil member in Modification 1 illustrated in FIG. 10.
Figure 12:
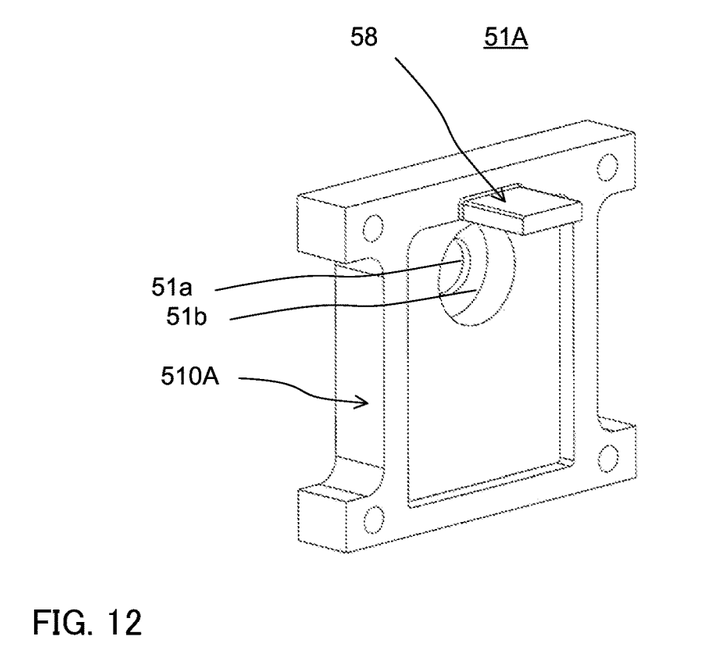
FIG. 12 is a perspective view of the first case of Modification 1.
Figure 13:
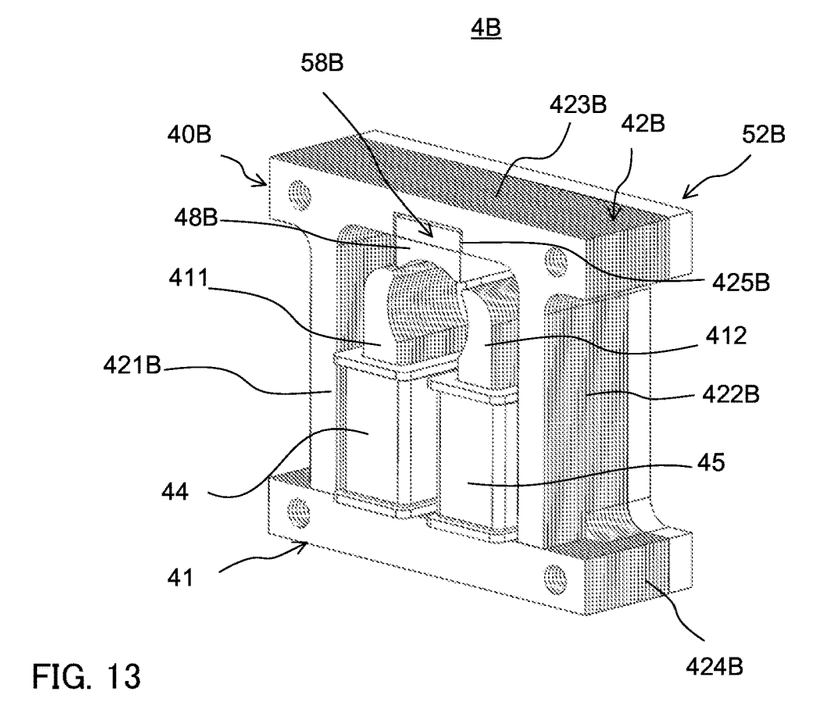
FIG. 13 is a perspective view illustrating a configuration of a core assembly of Modification 2.
Figure 14:
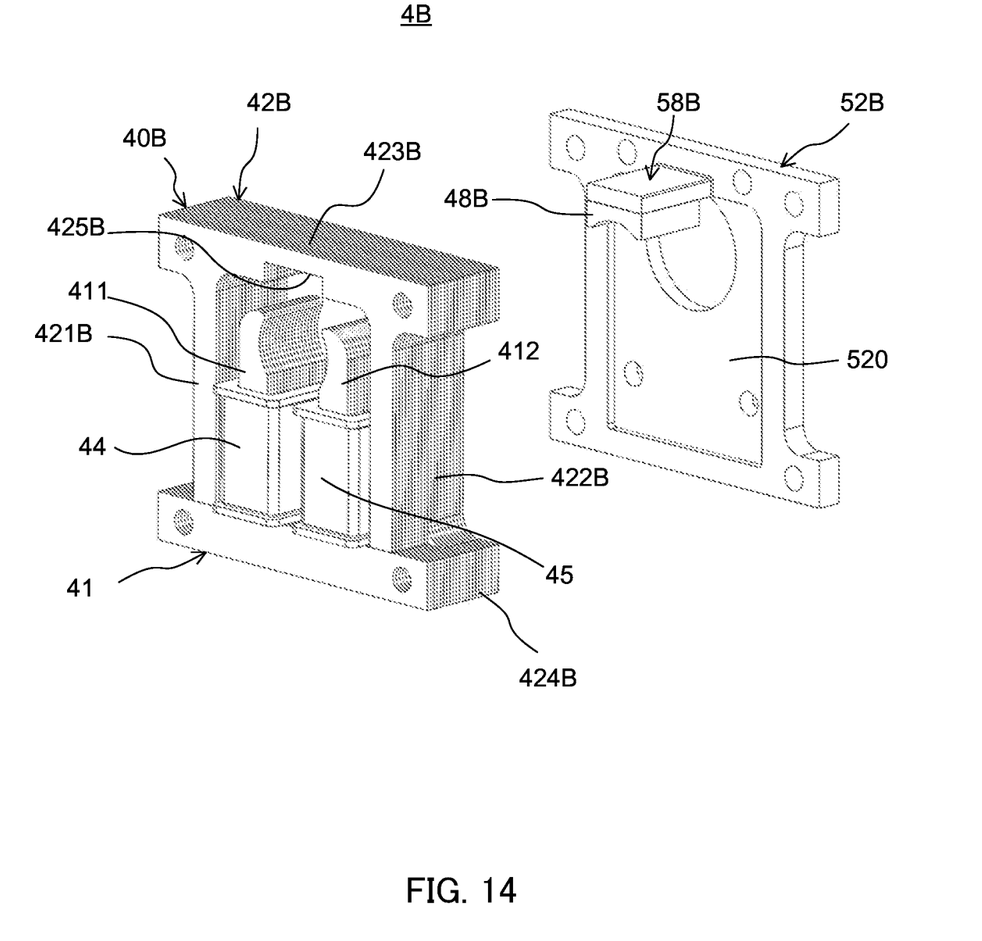
FIG. 14 is a perspective view illustrating a state where a second case is detached from a coil member in the core assembly of Modification 2.

FIG. 10 is a perspective view illustrating a configuration of core assembly 4 of Modification 1 (except for the second case and the auxiliary bearing), FIG. 11 is a perspective view illustrating a state where the first case is detached from the coil member in Modification 1 illustrated in FIG. 10, and FIG. 12 is a perspective view of the first case of the core assembly of Modification 1. In addition, FIG. 13 is a perspective view illustrating a configuration of a core assembly of Modification 2 (except for the first case and the first bearing), and FIG. 14 is a perspective view illustrating a state where the second case is detached from the coil member in the core assembly of Modification 2.

Note that core assemblies 4A and 4B illustrated in FIG. 10 to FIG. 14 is mainly different from core assembly 4 in which rotation angle position holding part 48 is provided at core member 40 in that rotation angle position holding parts 48A and 48B are provided at first case 51A and second case 52B, respectively. In FIG. 11 to FIG. 14, the same components as those of the embodiment are denoted with the same names and the same reference numerals with A and B attached, and the reiterated descriptions will be omitted.

Core assembly 4A illustrated in FIG. 10 and FIG. 11 is different from core assembly 4 in the configurations of magnetic path core 42A, rotation angle position holding part 48A and first case 51A.

As illustrated in FIG. 10 and FIG. 11, in core assembly 4A, rotation angle position holding part 48A is provided in first case 51A disposed next to core member 40A composed of magnetic pole core 41 and magnetic path core 42.

As illustrated in FIG. 11 and FIG. 12, first case 51A includes protruding side portion 58 protruding to core member 40A side at the surface facing core member 40A at plate-shaped main body part 510A that is opposite on the left side surface side of core member 40B. Rotation angle position holding part 48A is attached to protruding side portion 58. Note that bearing attaching portion 51b continuous from through hole 51a is provided at the surface of main body part 510A on core member 40A side. First bearing 53 is fit into bearing attaching portion 51b.

On the other hand, in core member 40A, at the center portion of bridge part 423A in magnetic path core 42A, recessed cutout 425A extending the thickness direction of core member 40A, which is the rotation axis direction is formed. When first case 51A is attached to core member 40A, protruding side portion 58 is fit into cutout 425A. Rotation angle position holding part 48A attached to protruding side portion 58 is disposed at the same position as rotation angle position holding part 48 facing magnet 32. Rotation angle position holding part 48A has the same function as that of rotation angle position holding part 48.

In addition, in core assembly 4B illustrated in FIG. 13 and FIG. 14, rotation angle position holding part 48B is provided on second case 52 side. That is, core assembly 4B has the same configuration as that of core member 40A. Core member 40B includes magnetic pole core 41 in which coils 44 and 45 are wound around rod members 411 and 421, and magnetic path core 42B including cutout 425B as with magnetic path core 42A provided with cutout 425A.

In magnetic path core 42B, recessed cutout 425B is provided at bridge part 423B as with cutout 425A of magnetic path core 42A. Protruding side portion 58B is fit into cutout 425B, and rotation angle position holding part 48B is attached to protruding side portion 58B, and, it is disposed at a predetermined position facing magnet 32.

In core assemblies 4A and 4B in Modifications 1 and 2, rotation angle position holding parts 48A and 48B, which are magnetic substances, are provided at first case 51A and second case 52, not at magnetic path cores 42A and 42B.

In this manner, rotation angle position holding parts 48A and 48B can be separated from core members 40A and 40B through which the magnetic flux passes, and the reduction in torque characteristics can be prevented while achieving the function of maintaining the rotation angle without increasing the number of components, and without causing magnetic saturation of core member 40, e.g., magnetic path core 42.

The embodiments disclosed here are in all respects to be considered illustrative and not restrictive. The scope of the invention is indicated by the claims, not by the above description, and is intended to include all modifications within the meaning and scope equivalent to the claims.

INDUSTRIAL APPLICABILITY

The present invention is suitable for LiDAR devices, scanner systems and the like, for example.

REFERENCE SIGNS LIST

1 Rotary reciprocating driving actuator
4, 4A, 4B Core assembly
10 Movable member
12 Mirror part (Movable object)
13 Rotation shaft (Shaft part)
20 Fixing body
21 Base part
211, 212 Wall part
22, 23 Bearing
30 Driving part
32 Magnet
32a S pole
32b N pole
32c, 32d Magnetic pole switching part (Boundary portion)
40, 40A, 40B Core member
40a, 40b Mounting hole
41 Magnetic pole core
42, 42A, 42B Magnetic path core
44, 45 Coil
46, 47 Bobbin
48, 48A, 48B Rotation angle position holding part (Magnet position holding part)
51, 51A First case
51a Through hole
51b Bearing attaching portion
52, 52B Second case (Joining member)
52a Insertion hole
53 First bearing
58, 58B Protruding side portion
70 Sensor part
61, 62 Fastening member
100 Scanner system
101 Laser light emission part
102 Laser control part
103 Driving signal supply part
104 Position control signal calculation part
121 Mirror
122 Mirror holder
122a, 211a, 212a Insertion hole
211, 212 Wall part
211b, 212b Cutout hole
213 Bottom portion
411, 412 Rod member
411a, 412a Magnetic pole
411b, 412b, 421b, 422b Base end portion
413 Connection member
413a Magnetic pole side contact surface
413b Core fixing piece part
421, 422 Leg part
423, 423A, 423B Bridge part
424 Magnetic path side connection member
424a Magnetic path side contact surface
425, 425A, 425B Cutout
510A Main body part

The invention claimed is:

1. A rotary reciprocating driving actuator comprising:
a movable member including a shaft part to which a movable object is connected and a magnet fixed to the shaft part; and
a fixing body including a core assembly including a magnetic pole core with an integral structure including a plurality of magnetic poles, a plurality of coils disposed next to the plurality of magnetic poles, and a magnetic path core to which the magnetic pole core is assembled, wherein the core assembly is disposed such that the plurality of magnetic poles faces an outer periphery of the magnet, wherein
a magnetic flux that passes through a magnetic path configured of the magnetic path core and the magnetic pole core of the integral structure is generated through energization of the plurality of coils, and the movable member is rotated back and forth around an axis of the shaft part through electromagnetic interaction of the magnetic flux and the magnet.

2. The rotary reciprocating driving actuator according to claim 1,
wherein the magnetic pole core includes, in the integral structure,
a plurality of rod members including the plurality of magnetic poles at respective end portions, the plurality of rod members extending in parallel with each other from base end portions to the end portions, wherein the plurality of coils is inserted outside respective intermediate portions; and
a connection member extending in a direction that intersects an arrangement direction of the rod members at the base end portions, the connection member being configured to connect the plurality of rod members.

3. The rotary reciprocating driving actuator according to claim 2, wherein the magnetic path core faces the connection member in an extending direction of the shaft part, makes surface contact with the connection member, and is assembled with the magnetic pole core with the plurality of magnetic poles positioned around the shaft part.

4. The rotary reciprocating driving actuator according to claim 1 wherein the magnetic pole core and the magnetic path core are laminate members.

5. The rotary reciprocating driving actuator according to claim 3, wherein the magnetic path core includes a surrounding part that surrounds the coil and makes surface contact at a portion thereof with the connection member of the magnetic pole core.

6. The rotary reciprocating driving actuator according to claim 5,
wherein the surrounding part includes:
a pair of leg parts extending along the arrangement direction of the plurality of rod members from both end portions of the connection member;
a bridge part provided to bridge top end portions of the pair of leg parts; and
a magnetic path side connection member that connects base end portions of the pair of leg parts and makes surface contact with the connection member of the magnetic pole core; and
wherein a magnet position holding part that attracts the magnet to a reference position with a magnetic attractive force generated between the magnet and the magnet position holding part is provided at the bridge part.

7. The rotary reciprocating driving actuator according to claim 6, wherein the magnet position holding part is disposed between the bridge part and the magnet at a position between the plurality of magnetic poles and at a position opposite to a radial direction of the magnet.

8. The rotary reciprocating driving actuator according to claim 6, wherein the magnet position holding part is a magnet.

9. The rotary reciprocating driving actuator according to claim 6, wherein the magnet position holding part is a magnetic substance.

10. The rotary reciprocating driving actuator according to claim 6, wherein
the fixing body includes a joining member that positions and joins the core assembly; and
the magnet position holding part is provided at the joining member.

11. The rotary reciprocating driving actuator according to claim 1, wherein the movable object is a mirror that reflects scanning light.

* * * * *